(12) United States Patent
Ayers

(10) Patent No.: US 7,028,255 B1
(45) Date of Patent: Apr. 11, 2006

(54) SELF-SIZING OBJECT PLACEMENT

(75) Inventor: Bob M. Ayers, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 694 days.

(21) Appl. No.: 09/639,582

(22) Filed: Aug. 14, 2000

(51) Int. Cl.
G06F 15/00 (2006.01)

(52) U.S. Cl. ...................... 715/517; 715/520

(58) Field of Classification Search ................ 715/517, 715/518, 520, 521, 500, 815, 788
See application file for complete search history.

(56) References Cited

U.S. PATENT DOCUMENTS

| | | | |
|---|---|---|---|
| 4,723,209 A | 2/1988 | Hernandez et al. | |
| 5,031,121 A | 7/1991 | Iwai et al. | |
| 5,164,899 A * | 11/1992 | Sobotka et al. | 704/9 |
| 5,214,755 A * | 5/1993 | Mason | 715/520 |
| 5,323,312 A | 6/1994 | Saito et al. | |
| 5,379,373 A | 1/1995 | Hayashi et al. | |
| 5,467,448 A | 11/1995 | Hilton et al. | |
| 5,633,996 A * | 5/1997 | Hayashi et al. | 715/513 |
| 5,742,837 A * | 4/1998 | Fukui et al. | 715/517 |
| 5,819,300 A | 10/1998 | Kohno et al. | |
| 5,845,303 A | 12/1998 | Templeman | |
| 5,873,106 A * | 2/1999 | Joseph | 715/506 |
| 5,893,127 A * | 4/1999 | Tyan et al. | 715/513 |
| 5,978,819 A | 11/1999 | Berstis | |
| 6,084,595 A | 7/2000 | Bach et al. | |
| 6,137,488 A * | 10/2000 | Kraft et al. | 715/866 |
| 6,266,684 B1 * | 7/2001 | Kraus et al. | 715/513 |
| 6,288,719 B1 * | 9/2001 | Squilla et al. | 715/805 |
| 6,324,555 B1 * | 11/2001 | Sites | 715/517 |
| 6,326,970 B1 * | 12/2001 | Mott et al. | 345/667 |
| 6,542,629 B1 * | 4/2003 | Wu et al. | 382/135 |
| 6,583,800 B1 | 6/2003 | Ridgley et al. | |
| 6,596,032 B1 | 7/2003 | Nojima et al. | |
| 6,606,105 B1 * | 8/2003 | Quartetti | 345/853 |
| 6,620,206 B1 * | 9/2003 | Seaman et al. | 715/518 |
| 6,626,958 B1 * | 9/2003 | McCauley et al. | 715/517 |
| 6,636,648 B1 * | 10/2003 | Loui et al. | 382/284 |
| 6,636,849 B1 | 10/2003 | Tang et al. | |
| 6,643,652 B1 | 11/2003 | Helgeson et al. | |
| 6,654,734 B1 | 11/2003 | Mani et al. | |
| 6,687,876 B1 | 2/2004 | Schilit et al. | |
| 6,766,362 B1 * | 7/2004 | Miyasaka et al. | 709/219 |
| 6,813,746 B1 * | 11/2004 | O'Shea | 715/517 |
| 6,826,727 B1 * | 11/2004 | Mohr et al. | 715/517 |
| 6,877,135 B1 * | 4/2005 | Kamiwada et al. | 715/501.1 |
| 6,915,484 B1 | 7/2005 | Ayers et al. | |
| 2002/0004805 A1 * | 1/2002 | Nojima et al. | 707/520 |

(Continued)

OTHER PUBLICATIONS

Microsoft PowerPoint 2000, Copyright 1987-1999 Microsoft Corporation, referred as PowerPoint, screenshots, pp. 1-7.*

(Continued)

Primary Examiner—Cong-Lac Huynh
(74) Attorney, Agent, or Firm—Fish & Richardson P.C.

(57) ABSTRACT

A method and computer program product includes identifying a page layout template having a plurality of dimensions including one or more variable dimensions, the template lacking a size specification for the variable dimensions and including at least one box having adjustable metrics in the variable dimensions specifying at least one of a size of the box and a distance from the box to any other boxes; fixing a size for each variable dimension of the template; and adjusting the metrics of the box based on the sizes.

18 Claims, 5 Drawing Sheets

U.S. PATENT DOCUMENTS

| | | |
|---|---|---|
| 2002/0021308 A1 | 2/2002 | White et al. |
| 2003/0135520 A1 | 7/2003 | Mitchell et al. |
| 2003/0158897 A1 | 8/2003 | Ben-Natan et al. |
| 2003/0169926 A1 | 9/2003 | Sonmez et al. |
| 2003/0227487 A1 | 12/2003 | Hugh |
| 2005/0223320 A1* | 10/2005 | Brintzenhofe et al. ...... 715/517 |

OTHER PUBLICATIONS

Sears, AIDE: A step toward metric-based interface development tools, ACM 1995, pp. 101-110.*

Peels et al., Document Architecture and Text Formatting, ACM 1985, pp. 374-369.*

Microsoft Corporation, Microsoft PowerPoint 2000, copyright 1987-1999, screenshots, pp. 8-15.*

Hurst et al., Layout and Language: Integrating Spatial and Linguistic Knowledge for Layout Understanding Tasks, ACM Jul. 2000, pp. 334-340.*

Haley, "Data-Driven Backward Chaining," Published in the Proceedings of the Second Annual CLIPS Conference, NASA Johnson Space Center, Houston, TX, Sep. 1991.

Hardman, et al., "Towards Multimedia on the Semantic Web," www.cwi.ni/ins2/.

Interscript, "A Standard for the Interchange of Editable Documents," Version 2.0, Sep. 1983.

Interscript—"Document Description Language," p. 1-29, www.acii.com/isc.htm, Mar. 13, 2002.

Magellan 4.2 User Manual, 2000, BCL Computers.

Microsoft Word 2000, 1999, Microsoft Corporation, Version 9.06926 SP-3.

Adobbati, et al., "Automatic Generation of Visual Presentations for Software Understanding," www.isi.edu/isd/media-doc/CCS98.html, Mar.13, 2002.

BCL's SimplEBook Opens ebooks to the Web, Jul.25, 2000, Business Wire.

* cited by examiner

SELF-SIZING OBJECT PLACEMENT

BACKGROUND OF THE INVENTION

The present invention relates generally to page layout templates for electronic documents.

Recent advances in network technology, especially in the Internet arena, have produced dramatic increases in the electronic exchange of information. For example, the exchange of electronic documents has become increasingly popular. One key goal in this area is to retain the layout and formatting of electronic documents. To this end, several page layout standards have arisen.

One public domain document page layout standard is Xerox InterScript. Xerox InterScript, the fundamental layout entity is the "box." A hierarchical tree of boxes forms a layout template. Each box has an associated set of metrics that define its size and its positioning relative to its "sibling" boxes and its "container" box. Boxes are siblings if they exist at the same hierarchical level of the layout template tree and are contained within the same container box. A container box is a box that contains another box. The metrics may be fixed or variable. Variable metrics generally specify a range of permissible values around a nominal value. Thus, variable metrics permit a degree of "stretchability" for a box.

During the Xerox InterScript layout process, new boxes are created and are "poured" into existing boxes. For example, a column box is created to contain a column of text. Then, a line box is created for each line in the column, and the line boxes are poured into the column box. During the Xerox InterScript layout process, the nominal values of the metrics are used. For example, the nominal value for the width of the column box is used for the purposes of text layout.

Figure 2:
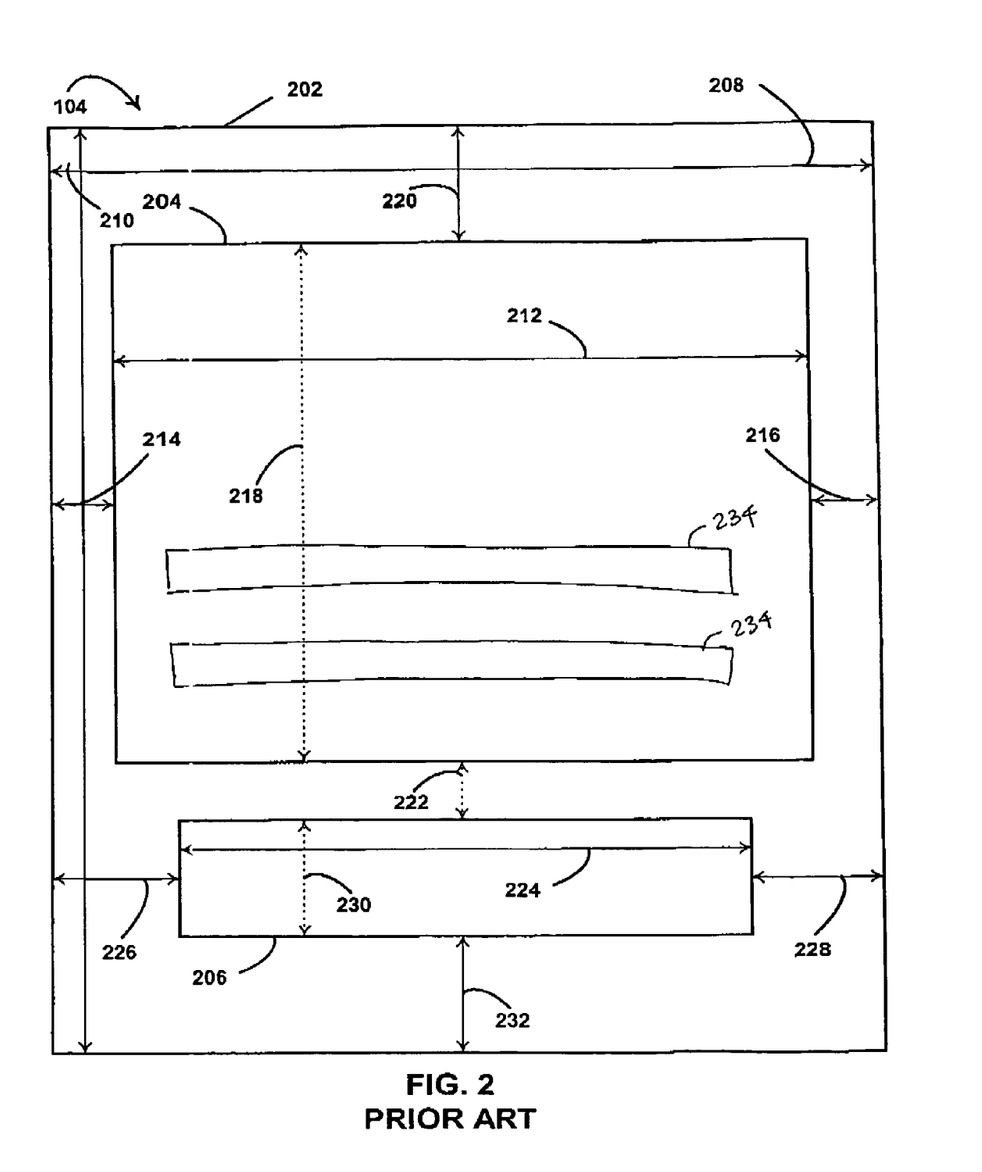
FIG. 2 depicts a conventional fixed page layout template.

After the "pouring" phase of an Xerox InterScript layout, certain boxes may have their dimensions "synthesized" as a function of the boxes now contained within them. For example, a column box 204 (FIG. 2) may specify that its final height is to be the sum of the heights of its contained lines 234 (FIG. 2).

Thus, in Xerox InterScript, shrink and stretch adjustments can be made at the end of the layout, after all the document content has been poured into the layout. For example, the lines in the column can be slightly spaced out to fill the column when the column height is not a multiple of the final average line height. This process is referred to as "column justification."

The mechanism as described by the Xerox InterScript proposal works well when the external bounding box is fixed (for example, the bounding box may be a predefined sheet of paper such as an 8½×11 inch sheet).

Figure 1:
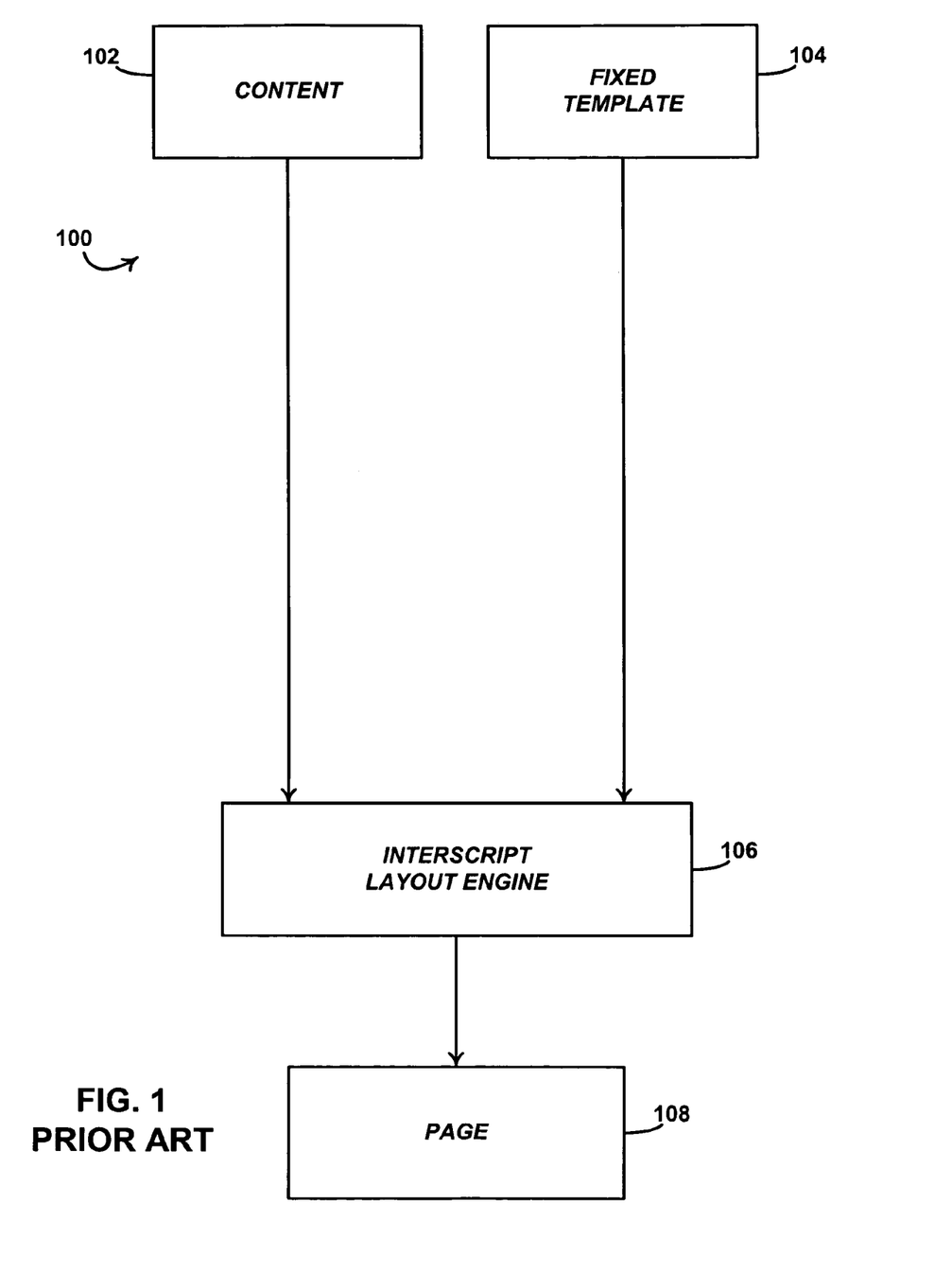
FIG. 1 is a block diagram depicting a conventional Xerox InterScript layout process.

FIG. 1 is a block diagram depicting a conventional Xerox InterScript layout process 100. A Xerox InterScript layout engine 106 receives document content 102 and a fixed page layout template 104 and produces a page 108. The page layout template is referred to as a "fixed" template because all of the dimensions of its external bounding box (that is, the bounding box at the top of its page layout hierarchy) are fixed in advance. A fixed page layout template may contain variable metrics at lower layers.

FIG. 2 depicts a conventional fixed page layout template 104. Template 104 has an external bounding box 202 that contains two sibling boxes 204 and 206. Box 202 has a fixed width 208 and a fixed height 210. For convenience, fixed dimensions are depicted as solid line arrows, and variable dimensions are depicted as dashed line arrows. Because template 104 is a fixed template, the dimensions of its external bounding box 202 are fixed. Therefore, dimensions 208 and 210 are shown with solid line arrows. For example, assume template 104 specifies an 8½×11 piece of paper. Then page width 208 is 8½ inches and page height 210 is 11 inches.

Box 204 is a synthesized box having a fixed width 212 and a variable height 218. Template 104 specifies that box 204 is to be a fixed distance 220 from the top of the page, a fixed distance 214 from the left edge of the page, and a fixed distance 216 from the right edge of the page. In addition, template 104 specifies that box 204 is to be a variable distance 222 from its sibling box 206. For our example, box width 212 is 7½ inches and each of margins 214 and 216 are ½ inch. In addition, top margin 220 is one inch. Metric 222 is ½ inch plus or minus ¼ inch.

Box 206 has a fixed width 224 and a variable height 230. Box 206 also has left and right margins 226 and 228, and a bottom margin 232. In our example, box width 224 is six inches and left and right margins 226, 228 are each one inch. In addition, bottom margin 232 is 3/4 of an inch. Box height 230 is synthesized.

SUMMARY OF THE INVENTION

In general, in one aspect, the invention features a method and computer program product. It includes identifying a page layout template having a plurality of dimensions including one or more variable dimensions, the template lacking a size specification for the variable dimensions and including at least one box having adjustable metrics in the variable dimensions specifying at least one of a size of the box and a distance from the box to any other boxes; fixing a size for each variable dimension of the template; and adjusting the metrics of the box based on the sizes.

Particular implementations can include one or more of the following features. The page layout template includes a plurality of boxes having a hierarchical relationship, and wherein the adjusting step includes adjusting the metrics of the boxes in hierarchical order.

The adjusting step can include adjusting the metrics of the boxes independently in each dimension.

10. The adjusting step can include adjusting the metrics of the boxes, first in the one dimension, and then in another dimension.

Terminating adjusting of a particular box and its child boxes in a given dimension at a hierarchical layer when the particular box has a synthesized size in the given dimension. It further includes flowing content into the boxes.

Advantages that can be seen in implementations of the invention include one or more of the following.

One advantage of the present invention is that now the same page layout template can be used for a multitude of page sizes. One no longer needs a separate template for A4 paper, for 5×7 note cards, and the like.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 3:
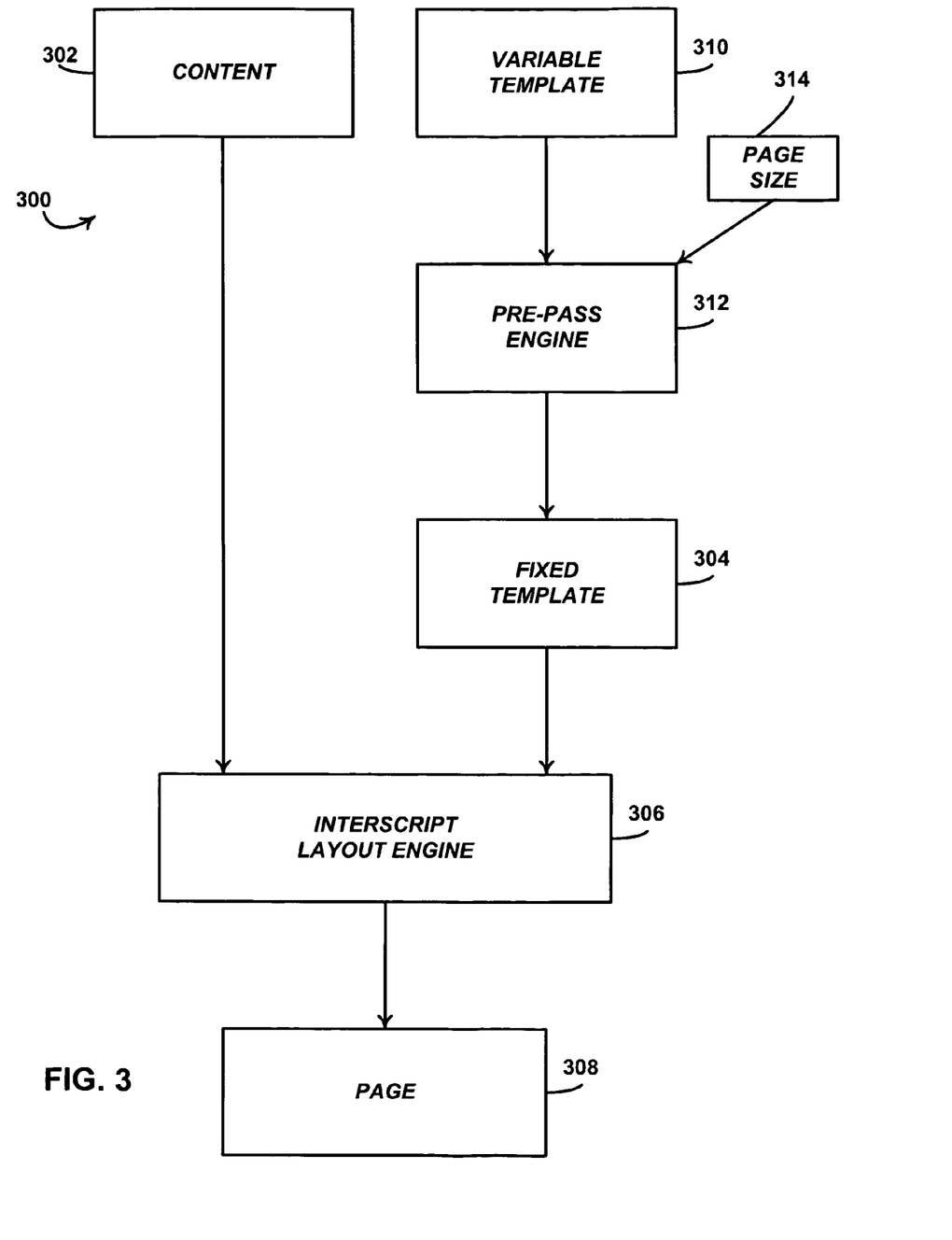
FIG. 3 is a block diagram depicting a document layout process.

FIG. 3 is a block diagram depicting a document layout process for producing a variable page layout template. The process begins with document content 302 and a variable page layout template 310. The page layout template is variable because at least one dimension of its external bounding box is variable. Therefore, variable page layout template 310 can be used to produce pages when their page sizes are not known in advance.

A pre-pass engine 312 receives variable page layout template 310. Pre-pass engine 312 also receives a page size 314 specifying the dimensions to be applied to the external bounding box of variable page layout template 310. Pre-pass engine 312 fixes the variable dimensions within variable page layout template 310 to produce a fixed page layout template 304, as described in detail below. According to one implementation, the synthesized dimensions within variable page layout template 310 are not fixed by pre-pass engine 312.

A Xerox InterScript layout engine 306 receives content 302 and fixed page layout template 304. Xerox InterScript layout engine 306 then pours content 302 into fixed page layout template 304 to produce page 308. Xerox InterScript layout engines are well-known.

Figure 4:
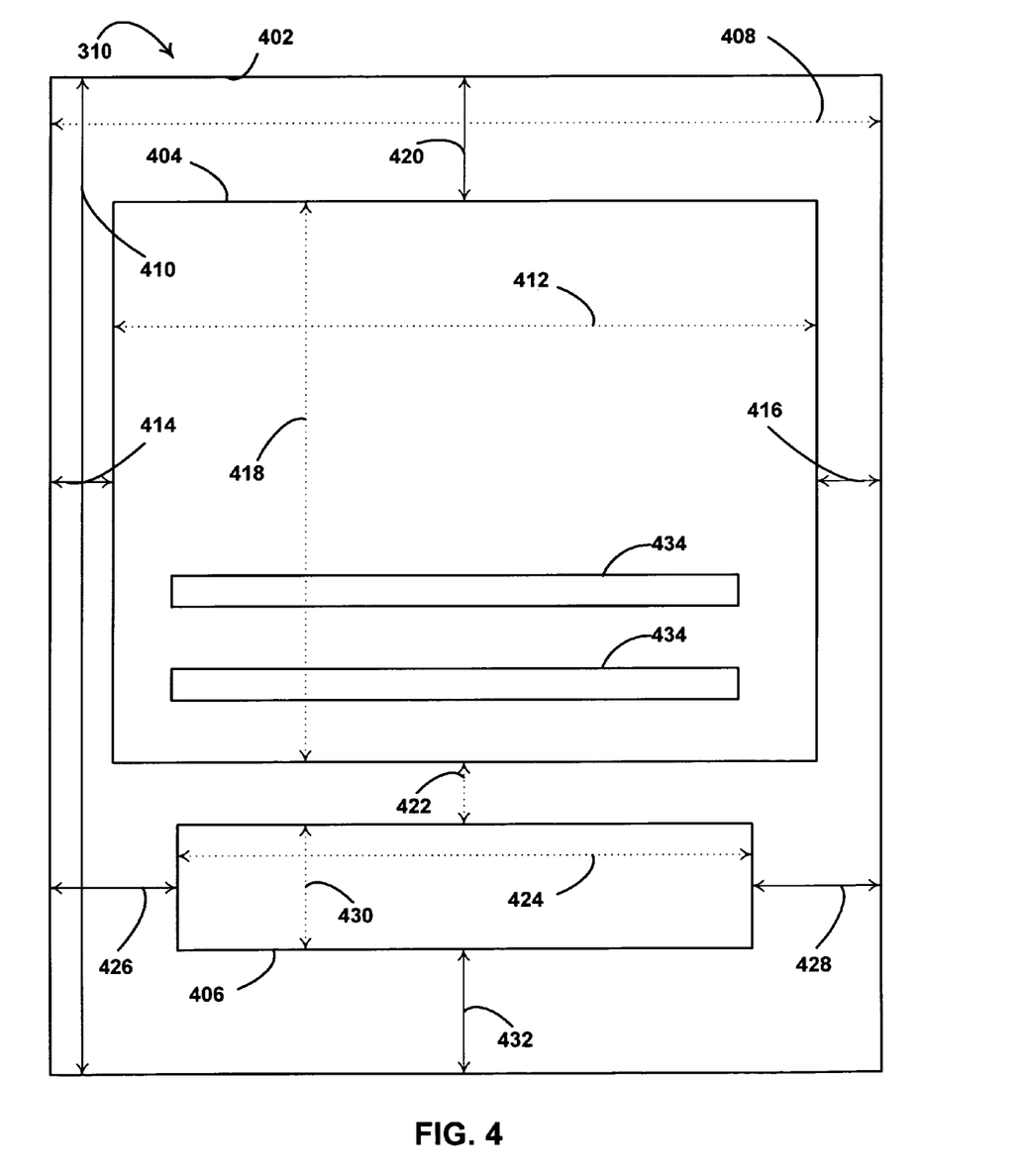
FIG. 4 depicts a variable page layout template produced in accordance with the process of FIG. 3.

FIG. 4 depicts a variable page layout template 310 according to an implementation of the present invention. Template 310 has an external bounding box 402 that contains two sibling boxes 404 and 406. For example, box 404 can contain the body of the page in one or more interior boxes 434, and box 406 can contain any footnotes associated with the body. Box 402 has a variable width 408 and a fixed height 410. For convenience, fixed dimensions are depicted as solid line arrows, and variable dimensions are depicted as dashed line arrows. Therefore, dimension 408 is represented with a dashed line arrow and dimension 410 is represented with a solid line arrow.

Box 404 is a synthesized box having a variable width 412 and a synthesized variable height 418. Template 310 specifies that box 404 is to be a fixed distance 420 from the top of the page, a fixed distance 414 from the left edge of the page, and a fixed distance 416 from the right edge of the page. In addition, template 310 specifies that box 404 is to be a variable distance 422 from its sibling box 406. For our example, each of margins 414 and 416 are ½ inch. In addition, top margin 420 is one inch. Metric 422 is ½ inch plus or minus ¼ inch.

Box 406 has a variable width 424 and a synthesized variable height 430. Box 406 also has left and right margins 426 and 428, and a bottom margin 432. In our example, left and right margins 426, 428 are each one inch. In addition, bottom margin 432 is ¾ of an inch. Box height 430 is synthesized.

While the above implementation is described in terms of the Xerox InterScript layout process and format, the present invention is not limited by this implementation. Implementations of the present invention can function with other document layout processes and formats, as would be apparent to one skilled in the relevant arts.

Figure 5:
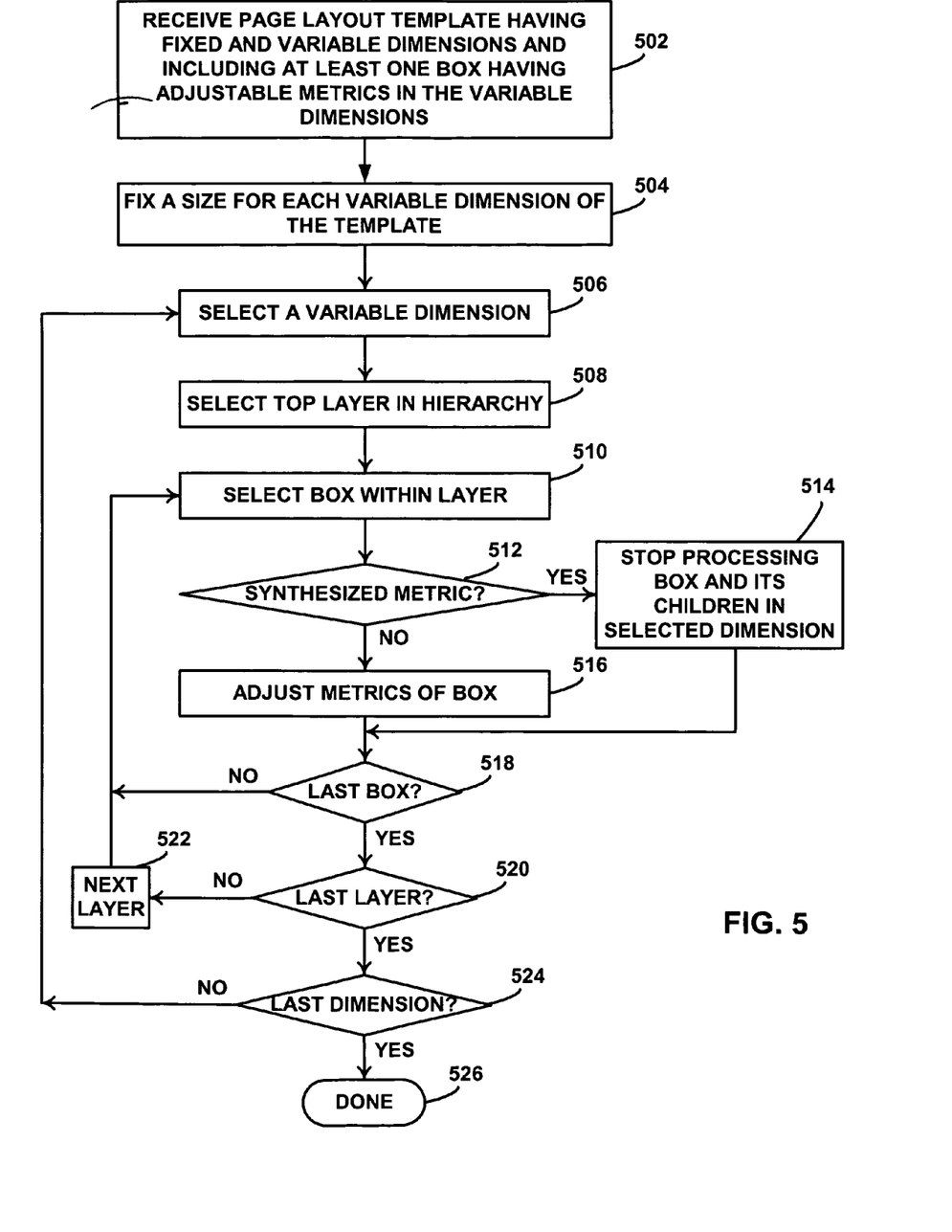
FIG. 5 is a flowchart depicting a process for document layout using a variable page layout template.

FIG. 5 is a flowchart depicting a process for document layout using a variable page layout template according to an implementation of the present invention. In one implementation, this process is performed by pre-pass engine 312 of FIG. 3. The process receives a variable page layout template in step 502. The template has fixed and variable dimensions and includes at least one box having adjustable metrics in the variable dimensions. For example, referring to variable template 310 of FIG. 4, the fixed dimension is height and the variable dimension is width. Template 310 includes three boxes that have adjustable metrics in the width dimension (metrics 408, 412 and 424). The adjustable metrics can specify the size of a box, the distance of the box to any container box and sibling boxes, or both.

The process fixes a size to be used with the variable page layout template in step 504 for each variable dimension of the template. In the example of FIG. 4, the process receives a page width to be used for metric 408. If the template has multiple variable dimensions, then a size for each of the variable dimensions is fixed in step 504. The template is finalized (the adjustable metrics are fixed) before content is poured into the template.

As described above, a page layout template generally includes a plurality of boxes having a hierarchical relationship, such as a tree. In one implementation, the boxes in a template are processed in hierarchical order from top to bottom (that is, from outermost box to innermost box). In another implementation, the dimensions of a template are processed independently. That is, the metrics in each variable dimension are processed without reference to the metrics in other variable dimensions.

In one implementation, boxes within a template are processed in hierarchical order, for example from top to bottom. Processing for a particular dimension on a branch of the tree is terminated when the branch reaches a box that has a metric that is synthesized in that dimension.

In the process of FIG. 5, a variable dimension is first selected for processing at step 506. The top layer of the hierarchy of boxes is selected in step 508. The top layer in the hierarchy is the outermost box. Referring to the example of FIG. 4, the top layer in the hierarchy of template 310 is box 402. The box within the selected layer in the hierarchy is selected in step 510. Referring to FIG. 4, box 402 is selected. The selected box is tested at step 512 to determine whether it includes a box (a "child box") that has a synthesized metric in the selected dimension. If so, then processing terminates for that box and its children (that is, boxes for which it is the container box), as shown in step 514. However, if the selected box contains no synthesized metrics in the selected dimension, then the metrics of the box and the selected dimension are adjusted at step 516. If there are more boxes to be processed within the selected layer (as indicated by the "no" branch from step 518), then another box within the layer is selected for processing. When all of the boxes in the selected layer have been processed (as indicated by the "yes" branch from step 518), then another layer may be processed. If layers remain to be processed (as indicated by the "no" branch from step 520), then another layer is selected for processing at step 522. When the last layer in the dimension has been processed (as indicated by the "yes" branch from step 520), then another dimension can be processed. If dimensions remain to be processed (as indicated by the "no" branch from step 524) then another variable dimension is selected for processing. When all of the dimensions have been processed (as indicated by the "yes" branch from step 524), then the process is complete at step 526. The result is a fixed page layout template 304.

The fixed page layout template can be passed to Xerox InterScript layout engine 306, where content is flowed into the boxes to produce a page 308.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer program product, tangibly stored on a computer-readable medium, comprising instructions operable to cause a programmable processor to perform operations comprising:
   receiving a page layout template, the template including a hierarchy of boxes, the hierarchy including an exterior bounding box for the template and one or more interior boxes contained within the exterior bounding box, the exterior bounding box forming the topmost level of the hierarchy, the one or more interior boxes forming one or more lower levels of the hierarchy, each lower level including one or more interior boxes, the exterior bounding box having one or more variable dimensions that have an undefined size specification, at least one of the interior boxes having one or more metrics that are variable in the same dimensions as the exterior bounding box, each metric specifying a size for the interior box, a distance between the interior box and another box, or both, the size or distance each being defined as two values, a first value specifying a nominal value, and a second value specifying a range of permissible values around the nominal value, the other box being another box on the same level or on a different level of the hierarchy;
   converting the one or more variable dimensions of the exterior bounding box into one or more fixed dimensions, each having a defined size specification; and
   adjusting the metrics of the interior boxes based on the fixed dimensions.

2. The product of claim 1, wherein adjusting the metrics of the interior boxes includes:
   adjusting the metrics of the interior boxes in hierarchical order.

3. The product of claim 2, wherein adjusting the metrics of the interior boxes in hierarchical order includes:
   adjusting the metrics of the interior boxes independently in each dimension.

4. The product of claim 2, wherein adjusting the metrics of the interior boxes in hierarchical order includes:
   adjusting the metrics of the interior boxes, first in one dimension, and then in another dimension.

5. The product of claim 4, wherein adjusting the metrics of the interior boxes, first in one dimension, and then in another dimension includes:
   terminating adjustment in a given dimension for an interior box and any child boxes contained within the interior box when the interior box has a synthesized metric in the given dimension, the synthesized metric being a metric that is adjusted after content has been flowed into the interior box.

6. The product of claim 1, wherein adjusting the metrics of the interior boxes includes:
   for each variable dimension,
     for each level of the hierarchy,
       for each interior box in the level,
         adjusting the metric in the variable dimension to a value within the range of permissible values.

7. The computer program product of claim 6, wherein adjusting the metric in the variable dimension includes:
   if the metric is a synthesized metric, terminating adjustment of the interior box and any child boxes contained within the interior box, the synthesized metric being a metric that is adjusted after content has been flowed into the interior box.

8. The product of claim 1, wherein:
   the metrics include a synthesized metric, the synthesized metric being a metric that is adjusted after content has been flowed into the interior box; and
   adjusting the metrics of the interior boxes includes adjusting the metrics of the interior boxes without adjusting the synthesized metric.

9. The computer program product of claim 8, wherein the operations further comprise:
   flowing content into the interior boxes; and
   adjusting the synthesized metric based on the flowed content.

10. A method comprising:
    receiving a page layout template, the template including a hierarchy of boxes, the hierarchy including an exterior bounding box for the template and one or more interior boxes contained within the exterior bounding box, the exterior bounding box forming the topmost level of the hierarchy, the one or more interior boxes forming one or more lower levels of the hierarchy, each lower level including one or more interior boxes, the exterior bounding box having one or more variable dimensions that have an undefined size specification, at least one of the interior boxes having one or more metrics that are variable in the same dimensions as the exterior bounding box, each metric specifying a size for the interior box, a distance between the interior box and another box, or both, the size or distance each being defined as two values, a first value specifying a nominal value, and a second value specifying a range of permissible values around the nominal value, the other box being another box on the same level or on a different level of the hierarchy;

converting the one or more variable dimensions of the exterior bounding box into one or more fixed dimensions, each having a defined size specification; and adjusting the metrics of the interior boxes based on the fixed dimensions.

11. The method of claim 10, wherein adjusting the metrics of the interior boxes includes:

adjusting the metrics of the interior boxes in hierarchical order.

12. The method of claim 11, wherein adjusting the metrics of the interior boxes in hierarchical order includes:

adjusting the metrics of the interior boxes independently in each dimension.

13. The method of claim 11, wherein adjusting the metrics of the interior boxes in hierarchical order includes:

adjusting the metrics of the interior boxes, first in one dimension, and then in another dimension.

14. The method of claim 13, wherein adjusting the metrics of the interior boxes, first in one dimension, and then in another dimension includes:

terminating adjustment in a given dimension for an interior box and any child boxes contained within the interior box when the interior box has a synthesized metric in the given dimension, the synthesized metric being a metric that is adjusted after content has been flowed into the interior box.

15. The method of claim 10, wherein adjusting the metrics of the interior boxes includes:

for each variable dimension,
   for each level of the hierarchy,
     for each interior box in the level,
      adjusting the metric in the variable dimension to a value within the range of permissible values.

16. The method of claim 15, wherein adjusting the metric in the variable dimension includes:

if the metric is a synthesized metric, terminating adjustment of the interior box and any child boxes contained within the interior box, the synthesized metric being a metric that is adjusted after content has been flowed into the interior box.

17. The method of claim 10, wherein:

the metrics include a synthesized metric, the synthesized metric being a metric that is adjusted after content has been flowed into the interior box; and adjusting the metrics of the interior boxes includes adjusting the metrics of the interior boxes without adjusting the synthesized metric.

18. The method of claim 17, further comprising:

flowing content into the interior boxes; and adjusting the synthesized metric based on the flowed content.

* * * * *